United States Patent
Matthews et al.

(10) Patent No.: US 9,329,768 B2
(45) Date of Patent: May 3, 2016

(54) PANNING CONTENT UTILIZING A DRAG OPERATION

(71) Applicant: MICROSOFT CORPORATION, Redmond, WA (US)

(72) Inventors: David A Matthews, Redmond, WA (US); Jan-Kristian Markiewicz, Redmond, WA (US); Reed L Townsend, Redmond, WA (US); Pamela De La Torre Baltierra, Redmond, WA (US); Todd A Torset, Redmond, WA (US); Josh A Clow, Redmond, WA (US); Xiao Tu, Redmond, WA (US); Leroy B Keely, Redmond, WA (US)

(73) Assignee: MICROSOFT TECHNOLOGY LICENSING LLC, Redmond, WA (US)

( * ) Notice: Subject to any disclaimer, the term of this patent is extended or adjusted under 35 U.S.C. 154(b) by 477 days.

(21) Appl. No.: 13/764,389

(22) Filed: Feb. 11, 2013

(65) Prior Publication Data
US 2013/0147749 A1    Jun. 13, 2013

Related U.S. Application Data

(63) Continuation of application No. 12/245,306, filed on Oct. 3, 2008, now Pat. No. 8,375,336.

(60) Provisional application No. 61/055,962, filed on May 23, 2008.

(51) Int. Cl.
*G06F 3/048* (2013.01)
*G06F 3/0488* (2013.01)

(52) U.S. Cl.
CPC .......... *G06F 3/0488* (2013.01); *G06F 3/04883* (2013.01)

(58) Field of Classification Search
CPC ....................................................... G06F 3/048
USPC ................................................. 715/863, 864
See application file for complete search history.

(56) References Cited

U.S. PATENT DOCUMENTS 5,943,052 A    8/1999    Allen et al.
6,181,344 B1 *  1/2001    Tarpenning et al. .......... 715/863
(Continued)

FOREIGN PATENT DOCUMENTS

JP    2005044036 A    2/2005
TW    I238348 B    8/2005
TW    I269997 B    1/2007

OTHER PUBLICATIONS

European Supplemental Search Report dated Feb. 25, 2014 in European Application No. 09751100, 9 pages.
(Continued)

*Primary Examiner* — David Phantana Angkool
(74) *Attorney, Agent, or Firm* — Jim Banowsky; Judy Yee; Micky Minhas

(57) ABSTRACT

Computer-readable media, computerized methods, and computer systems for intuitively invoking a panning action (e.g., moving content within a content region of a display area) by applying a user-initiated input at the content region rendered at a touchscreen interface are provided. Initially, aspects of the user-initiated input include a location of actuation (e.g., touch point on the touchscreen interface) and a gesture. Upon ascertaining that the actuation location occurred within the content region and that the gesture is a drag operation, based on a distance of uninterrupted tactile contact with the touchscreen interface, a panning mode may be initiated. When in the panning mode, and if the application rendering the content at the display area supports scrolling functionality, the gesture will control movement of the content within the content region. In particular, the drag operation of the gesture will pan the content within the display area when surfaced at the touchscreen interface.

20 Claims, 4 Drawing Sheets

(56) References Cited

U.S. PATENT DOCUMENTS

| | | | |
|---|---|---|---|
| 6,590,594 | B2 | 7/2003 | Bates et al. |
| 7,701,447 | B2 | 4/2010 | Lii et al. |
| 7,761,806 | B2* | 7/2010 | Kim ............................. 715/784 |
| 7,777,732 | B2* | 8/2010 | Herz et al. .................... 345/173 |
| 7,870,496 | B1* | 1/2011 | Sherwani ...................... 715/761 |
| 2001/0045949 | A1 | 11/2001 | Chithambaram et al. |
| 2004/0100479 | A1 | 5/2004 | Nakano et al. |
| 2006/0026535 | A1 | 2/2006 | Hotelling et al. |
| 2006/0048071 | A1 | 3/2006 | Jarrett et al. |
| 2007/0257891 | A1* | 11/2007 | Esenther et al. .............. 345/173 |
| 2007/0277126 | A1* | 11/2007 | Park et al. .................... 715/866 |
| 2009/0228792 | A1* | 9/2009 | van Os et al. ................. 715/702 |
| 2009/0243998 | A1* | 10/2009 | Wang ............................ 345/156 |
| 2009/0292989 | A1* | 11/2009 | Matthews et al. ............. 715/702 |

OTHER PUBLICATIONS

"Office Action and Search Report Received for Taiwan Patent Application No. 103134225", Mailed Date: Sep. 7, 2015, 9 Pages. (Partial English Translation).

"Office Action and Search Report Received for Taiwan Patent Application No. 98112559", Mailed Date: May 20, 2014, Filed Date: Apr. 15, 2009, 8 Pages.

Notice of Preliminary Rejection dated Apr. 30, 2015 in Korean Patent Application No. 10-2010-7026011, 2 pages.

\* cited by examiner

PANNING CONTENT UTILIZING A DRAG OPERATION

CROSS-REFERENCE TO RELATED APPLICATIONS

This application is a continuation of U.S. Nonprovisional application Ser. No. 12/245,306, filed Oct. 3, 2008, now pending, entitled "PANNING CONTENT UTILIZING A DRAG OPERATION," which claims the benefit of U.S. Provisional Application No. 61/055,962, filed May 23, 2008, entitled "PANNING CONTENT UTILIZING A DRAG-OPERATION." application Ser. Nos. 12/245,306 and 61/055,962 are herein incorporated by reference.

STATEMENT REGARDING FEDERALLY SPONSORED RESEARCH OR DEVELOPMENT

Not applicable.

BACKGROUND

Increasingly, computing devices (e.g., PDA's, cell phones, laptops, wireless handheld devices, and the like) that implement touchscreen interfaces have become popular in commercial markets. These touchscreen interfaces are an important differentiating feature for computing devices and other electronics as they tend to offer intuitive interaction with software integrated therein. Optimally, touchscreen interfaces should provide a complete software experience that can manipulate the software to achieve all the functionality available to conventional input device. However, a significant amount of provided software has not been designed with touch in mind, referred to hereinafter as touch-naïve applications. For instance, in the case of touch-naïve applications that are configured for scrolling through content rendered in a display area at a user-interface (UI) display, the scrolling functionality is not entirely integrated with a touchscreen interface. That is, the ability to scroll through content by applying a drag operation on a content region within the display area is not available to a touchscreen interface. Instead, typically, mouse users scroll content via conventional mouse inputs applied to the scrollbar, and keyboard users either use page up or page down, a keyboard shortcut like ctrl-end, or switch to using the mouse. These keyboard methods do not corporate with a touch interface, and applying touch to a touch interface in the same manner as mouse users (i.e., trying to drive the scrollbar accurately with a pointing device) is difficult due to the precision and targeting issues users generally have with applying the touch.

So far, no solution for making accessible complete functionality of touch-naïve applications to users of touchscreen interfaces has been developed. Even further, no scheme exists that adapts gestures applied to a touchscreen interface, which may be different in movement than expected movements from conventional input devices, to commands that manipulate the display of content in a display area in an optimized intuitive manner. As such, employing gesture-interpretation techniques for controlling scrolling functionality of touch-naïve applications would enhance a user's experience in panning content upon applying particular gestures (e.g., a drag operation at the content region of a display area) to the touchscreen interface. Generally, if an area includes a feature that allows vertical scrolling, panning messages are generated in accordance with the touches detected at the touch interface. Otherwise, touch input at the touch interface generates mouse messages.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide computer-readable media having computer-executable instructions embodied thereon, and a computer system for making accessible scrolling functionality of touch-naïve applications to users of touchscreen interfaces. In particular, techniques for controlling scrolling functionality of touch-naïve applications upon receiving an indication of a particular gesture (e.g., a drag operation at the content region of a display area) at a touchscreen interface are provided.

Generally, a method for panning content within a display area presented on a UI display of a computing device is provided. Initially, a user-initiated input applied to the touchscreen interface is detected and actuation information from the touchscreen interface is provided to an operating system. Typically, the touchscreen information includes a touch location and a gesture. Substantially concurrently with, or prior to, receiving the user-initiated input, the application is identified as supporting scrolling functionality. The operating system invokes a gesture-interpretation procedure to determine whether to pan the content within the display area, to pan the display area within the UI display, or perform another operation. In one embodiment, the gesture-interpretation procedure includes, but is not limited to, ascertaining that the touch location occurred within a content region of the display area surfaced at the touchscreen interface, and recognizing the gesture as a drag operation by disambiguating the drag operation from a tap-type operation based on a distance of an uninterrupted drag-movement from the actuation location. Typically, the content within the content region is rendered by a touch-naïve application integrated within the computing device, where the touch-naïve application is not built to recognize drag operations within the content region as an indication to pan the content. Upon recognizing the gesture as a drag operation and determining that the application supports scrolling functionality, the content is panned within the content region of the display area according to the drag operation. An indication of panning the content may be presented to a user at the touchscreen interface or any other presentation component.

BRIEF DESCRIPTION OF THE DRAWINGS

The present invention is described in detail below with reference to the attached drawing figures, wherein.

DETAILED DESCRIPTION

Figure 1:
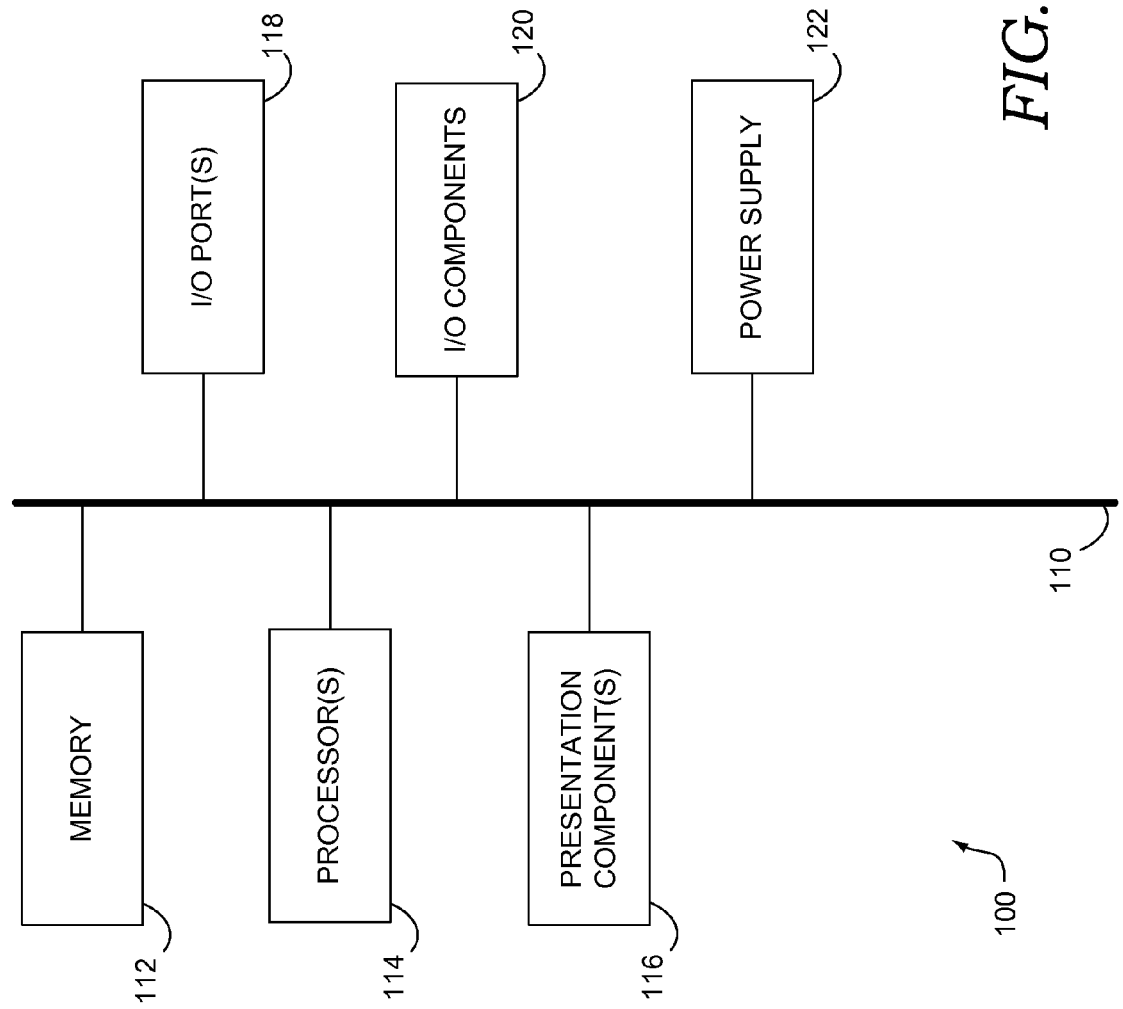
FIG. 1 is a block diagram of an exemplary computing environment suitable for use in implementing embodiments of the present invention.

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computer-readable media having computer-executable instructions embodied thereon, a computer system, and computerized methods for panning content within a content region of a display area rendered by a touch-naïve application that supports scrolling functionality by applying a gesture (e.g., drag operation) at a touchscreen interface.

Accordingly, in one aspect, the embodiments of the present invention provide one or more computer-readable media having computer-executable instructions embodied thereon that, when executed, perform a method for panning content within a display area presented at a touchscreen interface disposed on a computing device. In embodiments, the method includes detecting a user-initiated input applied to the touchscreen interface, and receiving actuation information from the touchscreen interface. Typically, the actuation information comprises a touch location and a gesture (e.g., single-finger contact within the touchscreen interface, interaction of a stylus or pen with the touchscreen interface, and the like). The method may further include ascertaining that the touch location occurred within a content region of the display area surfaced at the touchscreen interface. In embodiments, the display area may be rendered by an application integrated within an operating system of the computing device. Often, the application is touch-naïve, that is, unable to interpret gestures applied at the touchscreen interface upon attempting to manipulate scrolling or selection of the surfaced content. In an exemplary embodiment, the gesture is recognized by the system as a drag operation by disambiguating the drag operation from a tap-type operation based on a distance of an uninterrupted movement of the gesture from the actuation location of the user-initiated input at the touchscreen interface. By way of example the uninterrupted movement includes a sweep of the touchscreen interface that overcomes a threshold distance in a predefined Cartesianal direction. By leveraging the scrolling functionality of the application, the gesture may facilitate panning the content within the content region of the display area according to the drag operation. An indication of panning the content may be presented at the touchscreen interface. By way of example, presenting an indication of panning content may include revealing a translation of content within the content region, or demonstrating a movement of the display area at the UI display.

Generally, embodiments of the present invention relate touch panning within a touchscreen interface environment. As discussed herein, "touch panning" is not meant to be limiting but may encompass any use action that initiates scrolling functionality of an application. In one instance, touch panning includes a user action of scrolling through a page or list by touching the content region and performing a drag operation in order to make the content move in substantial correspondence with a contact translation of the drag operation. In the case where scrolling functionality is not provided by the application, touch panning may invoke a mouse drag. That is, if the application includes content that is vertically or horizontally scrollable, panning messages are provided thereto. Otherwise, mouse messages are generated. In effect, in one instance, the mouse messages may trigger a drag action that moves the display area within the UI display, instead of panning content. This translation of the display area across the screen may be similar to a drag action implemented by a mouse message generated upon detecting a click+hold+drag operation of a convention mouse. As such, interference with applications that do not scroll is avoided.

In order to facilitate touch panning, a gesture-recognition procedure for recognizing gestures encompassed by a user-initiated input on a touchscreen display, or other tactile-input device, as either a drag operation or a tap-type operation may be implemented. As discussed above, in one instance, the drag operation is disambiguated from the tap-type operation based on a distance of an uninterrupted movement. As used herein, the phrase "uninterrupted movement" is not meant to be limiting and may encompass any constant sweep, quasi-continuous input, or recursive chain of inputs that replicate a dragged contact across a surface of a touchscreen interface. In one instance, the uninterrupted movement may include contact between a physical object (e.g., stylus, pen, portion or pad of a finger, and the like) and the touchscreen interface. Generally, if the location of actuation occurs within a content region of a display area (e.g., window surfaced at a UI display) and a drag operation is recognized, a panning mode is invoked. As discussed with more detail below, in the panning mode, the operating system provides panning messages to an application rendering the content, as opposed to mouse messages that often do not initiate panning of content with the content region.

In an exemplary embodiment, if a drag operation in the vertical direction is recognized, a panning mode is invoked, regardless of whether the application supports vertical and/or horizontal scrolling. Horizontal drag movements would generate mouse messages, even if the application supported horizontal scrolling. Accordingly, a user could still achieve horizontal panning by starting with a vertical drag and then changing direction. In other words, vertical drags become pans, while horizontal drags become mouse drags. As such a consistent movement experience is introduced that triggers the panning mode for most applications.

In another embodiment, the gesture-recognition procedure is configured to perform the steps of ascertaining whether the touch location occurred within a content region of a display area surfaced at the touchscreen interface, where the display area is rendered by the application, and ascertaining whether the drag operation satisfies predefined system metrics in sequence or in parallel. If the touch location occurs within the content region and the drag operation satisfies predefined system metrics, the application enters a panning mode that supports scrolling functionality of content within the content region of the display area. Otherwise the application is retained in a default mode. In one aspect of the default mode, raw inputs associated with the gesture are allowed to flow from the touchscreen interface to the application as if it were a mouse input. In another aspect, the default mode induces the application to operate in a manner similar to the operation of a touch-naïve application. The application may be stored consistent with either the panning mode or the default mode.

Although several different methods for generating an uninterrupted movement have been described above, it should be understood and appreciated by those of ordinary skill in the art that various other drag-like inputs applied to a touchscreen component are contemplated herein as an uninterrupted movement, and that embodiments of the present invention are not limited to those methods shown and described. For instance, other uninterrupted movements that of a gesture are depicted at FIGS. 4-7.

In embodiments, the invention relates to interpreting gestures received at a touchscreen interface and providing messages to an application based on the interpretation. Use of the term "application" is not meant to be limiting but may include any software or program operably controlled by an operating system, where the operating system receives input information from the touchscreen interface upon detecting a user-initiated input. For instance, the application may be a third-party application that renders scrollable content at a presentation component and/or touchscreen interface. In this instance, the application is considered to support scrolling functionality. Also, scrolling functionality may be detected if a scrollbar tool is surfaced within the display area at the UI display.

In one embodiment, the application is gesture-aware. Gesture-aware applications are a class of applications designed with touch in mind and behave normally without interpreting gestures at a touchscreen interface and communicating the gestures in specific messages to the application. As such, gesture-aware applications are generally optimized with touch in mind, and can receive raw inputs from the touchscreen interface.

In another embodiment, the application is touch-naïve, which accounts for a majority of the applications existing in the current commercial marketplace. Generally, a touch-naïve application is one where panning features (e.g., accessing the scrolling functionality by inputs on the touchscreen interface within the content region) are not built, implemented, or written into the application. That is, the application is unaware that it is cooperating with touchscreen inputs, and, in particular, that the gestures performed at the touchscreen interface are attempting to pan content being rendered thereby. By way of example only, the naïve-touch application may be a legacy application (e.g., Notepad) in which the scrolling functionality for panning content is only invoked by providing an input at the scrollbar control.

Accordingly, aspects of the invention facilitate incorporating touch-panning capability into touch-naive applications, and is well suited for deployment in an operating system that comprises an ecosystem of touch-naive applications. For instance, the operating system may function as an interface that interconnects the touchscreen interface and the touch-naive applications, thereby managing the communication therebetween. By managing the communication, appropriate commands, in the form of messages (e.g., mouse messages or scrolling messages), may be passed to the touch-naive applications in order to properly adjust the presentation of content. As such, managing via the operating system generally allows the operating system to make most existing touch-naïve applications touch friendly.

Having briefly described an overview of embodiments of the present invention and some of the window states featured therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated to be within the scope of FIG. 1 in reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
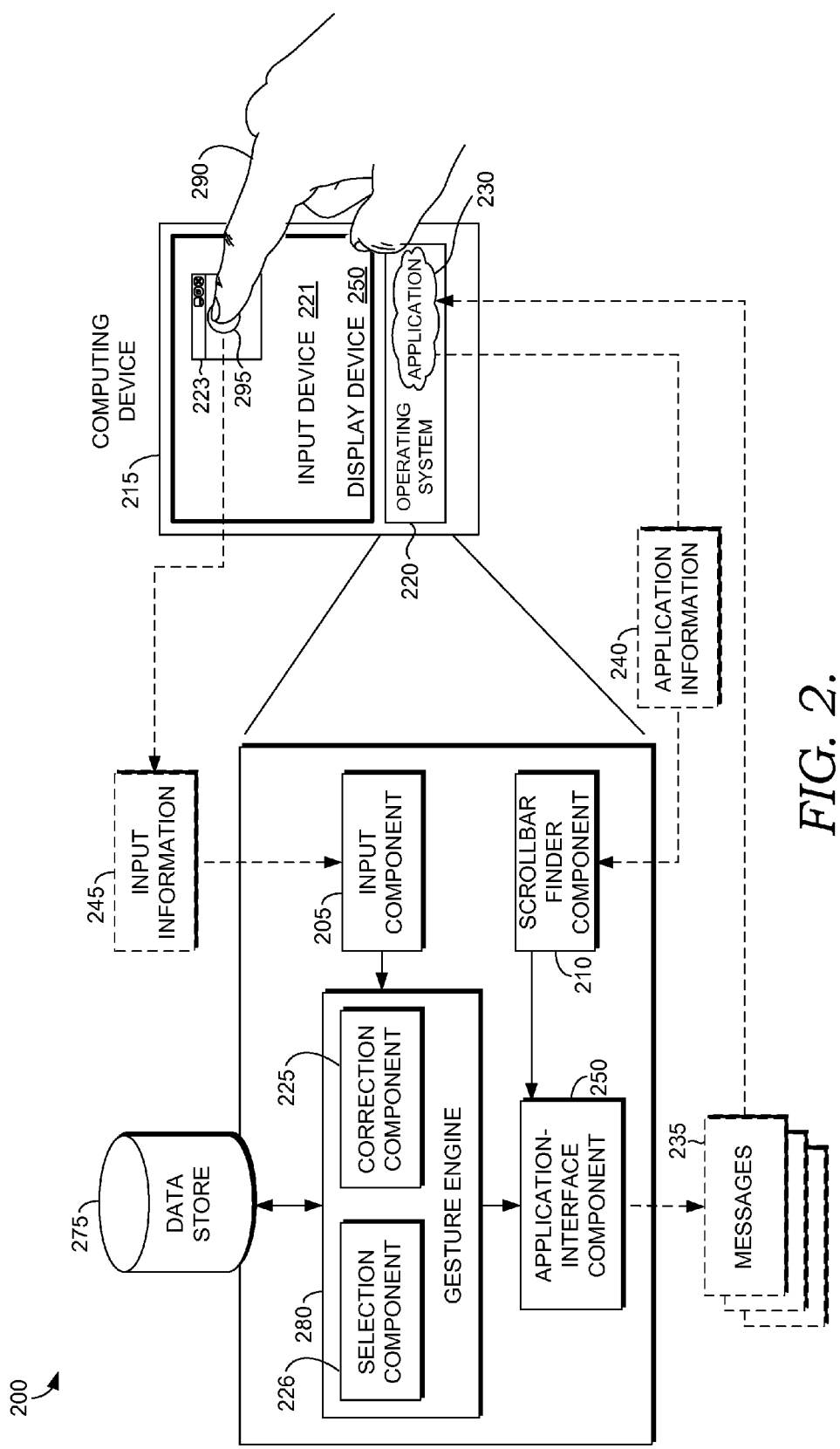
FIG. 2 is a schematic diagram of an exemplary system architecture suitable for use in implementing embodiments of the present invention, in accordance with an embodiment of the present invention.

Turning now to FIG. 2, a schematic diagram of an exemplary system architecture 200 suitable for use in implementing embodiments of the present invention is shown, in accordance with an embodiment of the present invention It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, a computing device 215 is provided. The computing device 215 may take the form of various types of computing devices. By way of example only, the computing device 215 may be a personal computing device (e.g., computing device 100 of FIG. 1), handheld device (e.g., personal digital assistant), a mobile device (e.g., laptop computer, cell phone, media player, tablet pc), consumer electronic device, various servers, and the like. Additionally, the computing device may comprise two or more electronic devices configured to share information therebetween.

In embodiments, a presentation component 250, an input device 221, and a processor (e.g., hardware-based component) may be operably coupled with, and/or disposed on, the computing device 215. Typically, an operating system 220 is installed on the processor. The computing device 215 is configured to present a UI display on the presentation component 250. The presentation component 250, which may be operably coupled to the processing component 225, may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. In one exemplary embodiment, the UI display rendered by the presentation component 250 is configured to present a display area 223 with a content region (not shown), where content rendered by application 230 is surfaced within the content region. In another exemplary embodiment, the UI display is capable of providing a visual indication of content panning within the content region or translating the display area 223 across a portion of the UI display.

In embodiments, the computing device 215 is operably coupled with an input device 221 and a presentation component 250. As such, communication between the input device 221, the presentation component 250, and the operating system 220 may be supported by a distributed computing environment, such as a remote server (not shown), or any combination thereof. In embodiments of the invention that are practiced in distributed computing environments, the communication is linked through appropriate connections. These connections may be wired or wireless. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the computing device 215 other remote components operably coupled thereto are not limited by the examples described, but embrace a wide variety of methods of communications.

The input device 221 is provided to accept user-initiated input(s) 295 affecting, among other things, panning of content within the content region. In an exemplary embodiment, the input device 221 receives the user-initiated inputs 295 directed at the display area 223 rendered on the UI display. Illustrative devices include a touchscreen interface (e.g., contemporaneously employed as the presentation component 250), the I/O components 120 of FIG. 1, touch digitizers, or any other component capable of receiving the user-initiated input 295 that includes a gesture and communicating an indication of that input to the operating system 220. By way of example only, the input device 221 may determine a coordinate location of where the user-initiated input 295 initiates contact therewith (e.g., location of actuation) and a coordinate location of where the user-initiated input 295 terminates contact therewith (e.g., location of release), with reference to items rendered at the GUI. These coordinate locations may be compared to determine a distance of an uninterrupted movement and a direction thereof, as discussed more fully below. Accordingly a drag operation may be distilled from a gesture applied at the input device 221. In embodiments, the input is pre-processed by a screen driver that derives input information from the raw input data prior to passing it on to the operating system 220.

Although several differing configurations of the input device 221 have been described above, it should be understood and appreciated by those of ordinary skill in the art that various types of input devices that receive inputs from physical contact 290, or otherwise (e.g., "touch" systems that interact/respond upon bringing an object within proximity to the screen without actually making contact), may be employed as the input device 221, and that embodiments of the present invention are not limited to those input devices 221 that are shown and described as being incorporated into the presentation component 250. For instance, the presentation component 250 may be a monitor operably coupled to a computer (e.g., computing device 215), while the input device 221 may be a stand-alone capacitive touchscreen that is in wireless communication (discussed above) with the computing device. However, for the sake of brevity and clarity, the input device 221 and the presentation component 250 will hereinafter be referred to jointly as a touchscreen interface, which is a touchscreen that offers the functionality of both a display and an input element as a single unit.

The operating system (OS) 220 refers generally to the software that manages the sharing of the resources of the processing component and provides programmers with an interface used to access those resources. In operation, the operating system 220 interprets system data and detects the user-initiated inputs 295 (e.g., via the input device 210), and responds by executing such processes as the following, in no particular order: receiving an input 295 from a physical object 290 (e.g., single-finger gesture, pen stroke, and the like) at the touchscreen interface, determining which gesture the input 295 performed, determining that the application 230 supports scrolling functionality, and filtering a communication of the input 295 to the application 230 if the gesture is mapped to a drag operation in a scrollable direction. As used herein, the phrase "scrollable direction" is not meant to be limiting, but generally relates to a direction in which the content is allowed to move within the content region, as governed by the application 230. In one instance, scrollable direction is substantially parallel to an alignment (e.g., horizontal or vertical) of a scrollbar tool.

In an exemplary embodiment, the operating system 220 runs on the processor and supports execution of one or more of applications, including the application 230. In other embodiment, the operating system 220 and/or the application 230 may partially or fully reside on a remotely located computing device (e.g., on another operating system, on a server located via a web address, etc.). In various embodiments, the operating system 220 determines whether to provide panning messages to the application 230 based on input information 245 received from the input device 221. Although the user-initiated input 295 is received from the touchscreen interface, illustrated in FIG. 2, it should be understood and appreciated that other inputs from various other input devices (e.g., a remote tactile-input panel) may be received and interpreted by the operating system 220; accordingly, the scope of the present invention is not limited to the inputs and input devices described herein. If the distance and/or direction of a gesture included within the input 295 satisfies system metrics for evaluating whether to initiate panning mode, the operating system 220 may provide scrolling messages to the application 230 causing the content to be panned in correspondence with the gesture. In such case, panning functionality of the application 230 mapped to a drag operation of the gesture is automatically invoked.

Generally, the application 230 is any program that may be launched and manipulated by the operating system 220. As discussed above, the application 230 manages content published on the UI display. In addition, the application 230 may be touch-naïve, as discussed above, or, alternatively, may be able to accept raw input from the touchscreen interface.

This operating-system structure of the operating system 220 is but one example of a suitable structure that may be run on the processor, and is not intended to suggest any limitation as to the scope of use or functionality of the invention. Neither should the illustrated operating system 220 be interpreted as having any dependency or requirement relating to any one or combination of receiving the user-initiated input 295 in the form of the input information 245 or providing the messages 235 as illustrated. Further, the application 230 may be integrated into the operating system 220 and is exemplary in nature and in number, and should not be construed as limiting.

In an exemplary embodiment, the operating system 220 includes an input component 205, a gesture engine 280 that includes a correction component 225 and a selection component 226, a scrollbar finder 210, and an application-interface component 235.

In addition, the operating system 220 may include a data store 275. In embodiments, the data store 275 may reside on the computing device 215, or on a remotely-located computing device (e.g., on another operating system, on a server located via a web address, etc.). The data store 275 may be configured to store information including messages mapped to particular gestures, system metrics (such as a trigger boundaries) for switching from panning content to selection of content, and any other data to relevant panning. Further, though illustrated as a single, independent component, the data store 275 may, in fact, be a plurality of databases, for instance, a server cluster.

This operating-system structure of the operating system 220 is but one example of a suitable structure that may be run on the computing device 215, and is not intended to suggest any limitation as to the scope of use or functionality of the invention. Neither should the illustrated operating system 220 be interpreted as having any dependency or requirement relating to any one or combination of the components 205, 210, 225, 226, 280, or 250 as illustrated. In some embodiments, one or more of the components 205, 210, 225, 226, 280, or 250 may be implemented as stand-alone applications. In other embodiments, one or more of the components 205, 210, 225, 226, 280, or 250 may be integrated directly into the display device 221 of the computing device 215, the application 230, or a combination thereof. By way of example only, the application-interface component 250 may be housed in association with the display device 221. It will be understood by those of ordinary skill in the art that the components 205, 210, 225, 226, 280, or 250 illustrated in FIG. 2 are exemplary in nature and in number and should not be construed as limiting.

Any number of components may be employed to achieve the desired functionality within the scope of embodiments of the present invention. Although the various components of FIG. 2 are shown with lines for the sake of clarity, in reality, delineating various components/elements is not so clear, and metaphorically, the lines would more accurately be grey or fuzzy. Further, although some components and devices of FIG. 2 are depicted as single blocks, the depictions are exemplary in nature and in number and are not to be construed as limiting (e.g., although only one display device 215 is shown, many more may be operably coupled to the computing device 210, thereby functioning in conjunction to present the UI display 225).

Initially, the input component 205 is configured to receive the input information 245 from the touchscreen interface. In an exemplary embodiment, the input information 245 may be derived from an input 290. By way of example, the input 290 may comprise a user-initiated physical contact when a user touches (e.g., single-finger gesture touch) the touchscreen interface. In other embodiments, the input information 245 includes a location of an actuation at the touchscreen interface (e.g., Cartesian coordinate position) and data related to a gesture (e.g., distance of uninterrupted movement, direction of movement, duration of actuation, and the like). This input information 245 may be pre-processed by a screen driver (not shown) that passes data to the input component 205. The input component 205 may then process the input information 205 before sending to the gesture engine 280.

The scrollbar finder component 210 makes the determination of whether the application 230 supports scrolling functionality. In one instance the determination is preformed by sniffing the application in order to recognize if a scrollbar tool exists within the display area 223. If the application 230 supports scrolling functionality, then scrolling messages may be sent to the application to perform panning movements of content based on a drag operation of a received gesture. Otherwise, standard "mouse messages" are provided to the application 230. The mouse messages are the unfiltered input 295 provided to a touch-naïve application (i.e., not configured for accepting gestures at a touchscreen interface) that controls the application in a similar fashion to what would be expected from using a mouse tool.

Although a method for determining whether the application 230 exhibits scrolling functionality at the UI display is discussed above, other methods for making this determination are encompassed by the scope of the scroll bar finder component 210 and may be applied to various different scrollbar implementations.

The gesture engine 280 is configured to determine tells which gesture is being performed by the user at the computing device 215. For instance, the gesture engine 280 is capable of processing a continuous, uninterrupted movement of a gesture and/or a duration of the gesture utilizing a timer. If the duration of the gesture does not comprise a distance of uninterrupted movement above a predefined distance or does not meet a predefined threshold time period, the gesture is considered a tap-type operation (e.g., tap simulating a mouse click). Otherwise, the gesture is considered a drag operation.

In embodiments, the gesture engine 280 disambiguates between a pan and a standard action. For instance, if the gesture is considered a drag operation, the gesture engine 280 looks at the UI display of the application 230 to determine if the user is dragging within a scrollable content region. In embodiments, techniques and approaches to identify whether the actuation location, or touch point that contacts the touchscreen interface, occurs within a scrolling content region are employed. If the actuation location is within the content region and a drag operation is recognized, instead of sending mouse messages, scrolling messages are sent to the application 230. In a particular embodiment, where the application 230 supports vertical scrolling, and the actuation location is detected within the content region, a vertical drag operation may invoke pan messages that trigger panning up or down, while a horizontal drag operation may invoke mouse messages that select text within the content region, slide the window on the screen, cut and/or paste, etc. In another embodiment, where the where the application 230 supports horizontal scrolling, and the actuation location is detected within the content region, a horizontal drag operation may invoke pan messages that trigger panning side-to-side, while a vertical drag operation may invoke mouse messages.

Accordingly, the content in the content region scrolls with the user's finger as s/he performs a drag. Accordingly, this approach allows users to drag their finger on a content area to pan, and use a different gestures to drag or select within the content regions. For instance, users can pan through a list of items in a file explorer menu by dragging a finger over a surface file list, and then perform a different gesture to select and move a file (e.g., perform a touch point on the title bar or border of the display area 230).

If the user is dragging over a non-scrollable content region (e.g., title bar, border, scrollbar tool, and the like) rendered by the application 230, mouse messages are sent to the application, utilizing the application interface component 250, such that dragging with the finger acts the same as clicking and dragging with the mouse. This allows users to drag or pan the display area 223 around screen (e.g., UI display), drag a slider of the scrollable content region, rearrange desktop icons, etc.

Generally, the gesture engine 280 filters the input by providing appropriate messages 235 to the application 230. The scrollable content, when dragged in scrollable direction, will move with a contact point on the touchscreen interface. In embodiments, an averaging mechanism is applied to erratic, or unintentional, movements within a gesture in order to smooth the movements of the content. The user is provided with an indication that panning content is available upon viewing a scrollbar tool rendered at the display area 223. As such, the user will intuitively drag with one finger to pan the content (e.g., page within a document, or map within a viewer). When the user drags their finger on a scrollable content region in a direction substantially parallel to the scrollbar control, the content pans in the appropriate direction. Panning continues until the user lifts their finger, or interrupts a continuous movement of the drag operation. In addition, panning the content may drive the slider of the scrollbar control in order to provide visual feedback that panning is being performed (e.g., automatically moves the scroll bar for the user). In an exemplary embodiment, this management of the input 295 to control the panning of content rendered by the application 230 is capable of interacting with various implementations of scrollbars.

In operation, the gesture engine 280 deciphers what type of gesture is occurring, where the gesture is originating, and whether other attributes of the gesture are available. Upon interpreting this information, the selection component 226 is configured to recognize an appropriate action, mapped to the deciphered gesture. This appropriate action is provided to the application interface component 250, which sends an appropriate message 235 to the application 230. For instance, if the gesture engine determines that the user is dragging on a non-scrollable portion of the display area, a normal left mouse drag action is invoked via the mapping. If the user drags in a direction that does not scroll (e.g., perpendicular to the scrollbar control), a left mouse drag, typically becoming selection or drag and drop in an application, occurs. Alternately, a user may select content by performing a hold then drag gesture in order to invoke a conventional left mouse drag action.

In embodiments, when a user drags a finger, or physical object 290, in a content region of the display area 223 (e.g., window generated by Internet Explorer, a media player, a notepad document, Word, Outlook, a start menu, a control panel, or other application-surfaced UI) in the same general direction as a scrollbar tool (e.g., up and down for a vertical scrollbar tool), the content (e.g., folder list, email list, grouped email list, scrolling font list) should pan under the finger. In addition, only the content of the selected display area 223, where the drag initiated, should be affected. As such, no other content in other panes should scroll or show hover states regardless where the drag travels. Again, dragging in display areas 223 that do not allow scrolling (e.g., static images on youtube.com) will cause the entire display area 223 to pan on the page. In order to effect these actions, the gesture engine 280 feeds a stream of communication to the application 223 to ensure that the application 223 treats the input 295 in a special way.

The selection component 226 is configured to select an appropriate action to send to the application-interface component 250 based on the input information 245. In addition, the selection component 226 is configured to determine when the user pans past the end of a scrolling region and provide an over-panning action that provides visual feedback to let the user know the s/he has reached the limit on available scrollable content. In one embodiment, the over-panning action moves the entire window in the direction that the user is sliding their finger on the touchscreen interface. Advantageously, this visual feedback of causing the entire display area 223 to move may be implemented, or scaled, to manipulate a legacy application. Specifically, because the operating system 220 has the capability of sliding a window on a screen, the over-panning action of moving the display area on the UI display can be implemented without cooperation from, or reciprocation by, the application 230. Accordingly, the over-panning action provides a clear indication that the scrolling functionality is available, but that the end of the page has been reached.

Because new users will often make the mistake of dragging in the wrong direction, the over-panning action provides an assistive behavior for alerting a user no further content is located in the direction of the drag operation. Also, the over-panning action provides a teaching behavior that is able to teach a user how to control content movement when panning. The mistake of panning in the opposite direction as a user intended occurs because dragging a finger in the content region typically moves the content in a direction opposite to pulling a slider of a scrollbar tool in that same direction. Specifically, when at the top of a document, new users will often drag their finger in a downward direction because they are used to that applying a downward motion when operating the scrollbar tool. But, when the panning mode is invoked, the entire window, or display area 223, will slide downward when user drags their finger downward in this situation. Thus, the over-panning action clearly and visually communicates that the panning is available, and that user is dragging in the wrong direction. However, as touch panning is a "direct manipulation system," where the content substantially moves in the direction of the drag, dragging content, or a page in a document, in an upward direction is fundamental to moving the page upward. Accordingly, if no over-panning action or other feedback is provided to a user, the user will often believe that the scrolling functionality is not available or not working.

Although one embodiment of an over-panning action is described, it should be understood and appreciated by those of ordinary skill in the art that other types of suitable over-panning actions that provide visual or audio feedback to a user that communicates the scrolling functionality is available may be employed, and that embodiments of the present invention are not limited to those over-panning actions described herein. In addition, the use of an over-panning action uniquely fits into a windowing multitasking system (i.e., ability to have many windows on the screen) where each running application lives within one or more display areas surfaced on the UI display. Further, this over-panning action may be triggered if the user "tosses" a page (i.e., applies a dramatic drag operation) such that the page scrolls to the end of the scrollable content in the content region. Tossing, in embodiments, provides the user with the ability to initially move the content under the control of the drag operation and then, upon cessation of the drag operation, automatically continuing panning the content and/or sliding the display area 223 as if the content had mass and was moving with inertia.

The correction component 225 is configured to provide a tolerance for drift in dragging when a direction substantially aligned with the scrollbar tool. For instance, when the user starts panning (e.g., by dragging upward within a scrollable content area), the selection component 226 will pan the page in the up and down direction, even if the user drifts slightly left or right a small amount when attempting to scroll vertically. Stated another way, users are able to pan vertically (i.e., directly up/down), or horizontally (e.g., directly to the left/right) even when the drag motion of their finger does not move exactly in those directions as the drag operation is performed. This feature may be turned off if the user-preference is such that panning diagonally is more efficient. However, typically the correction component 225 is active because panning content in the content region either directly up or down, or laterally, is less distracting and a more conventional/intuitive movement for viewing.

Due to friction during dragging and the general ergonomics of moving an entire arm to create an input, it is difficult for users to achieve to precise drag on the touchscreen interface. As a result, there is drift and/or wiggle inherent in a drag interaction. In operation, the correction component 225 notices the wiggle and/or drift of the drag and dampens these inputs such that the content pans in a straight line, that is, as if on rails. In one embodiment, dampening is performed by determining a principle axis of the direction of the drag operation. The ancillary movement in the non-principle axis is then filtered to assist in scrolling the particular direction of the drag operation. Accordingly, users are provided with a degree of tolerance when dragging, which facilitates panning in an intuitive and appeasing fashion.

In embodiments, as discussed with reference to FIGS. 4 and 5, threshold boundaries may be associated with the principle axis which are defined such that a significant ancillary movement (e.g., a perpendicular drag when the principle axis is vertical) will trigger a secondary action, such as selecting content located proximate to the touch point. That is, if the user drags far enough from the principle axis, a secondary action may be invoked. Accordingly, by directionally controlling the drag in a non-principle axis, a user is able to impose direction-specific behaviors, such as selecting text.

In the situation where a substantial amount of drag occurs in a direction that is not expected (e.g., against the principle axis), the dampening applied by the correction component 225 to the drag operation may be deactivated such that the user may freely pan in the direction that corresponds with their actual gesture. That is, the correction component 225, upon detection a threshold amount of drift, may switch the action from controlled panning to panning based on actual gesture movement. Or, a user may override the panning behavior (i.e., exit the panning mode) by overcoming a threshold amount of drift when applying a gesture. Upon the user to overriding the panning behavior, s/he can perform "normal drag operations," such as mouse-drag type operations. In other embodiments, without overriding the correction component 225, users are still able perform the secondary actions discussed above. In embodiments, a user may perform at least the following operations on a touchscreen interface to execute the secondary actions: press and hold for a predetermined duration of time, then drag; perform a double tap-type operation (within a particular time frame), then drag; or provide a multi-touch input, such as a two-finger drag. Other operations that a user may perform inside a scrollable content region to invoke the secondary actions may include dragging from left to right in display area that is limited to upward and downward scrolling. Upon processing the secondary action, the application 230 will behave as if a user was clicking and dragging with a mouse. Generally, this secondary action is useful for selecting text within an application. Upon receiving an indication of this secondary action, the application interface component may send mouse messages rather than scrolling messages to the application 230.

As discussed above, a user can press and hold, and then drag in order to temporarily disable the panning behavior. Once disabled, the user is free to use drag operations to perform secondary actions instead without invoking the panning mode. For instance, an input interpreted as press+hold+drag may invoke a secondary action that facilitates a selection gesture while temporarily stopping panning. In another embodiment, a received input gesture that is interpreted as a press+hold+release may disable the scrolling functionality (i.e., temporarily or permanently deactivating the panning mode), and allow the user to perform mouse drags (e.g., triggering a selection), such as copying an address in a webpage or moving a file into a folder.

Figure 3:
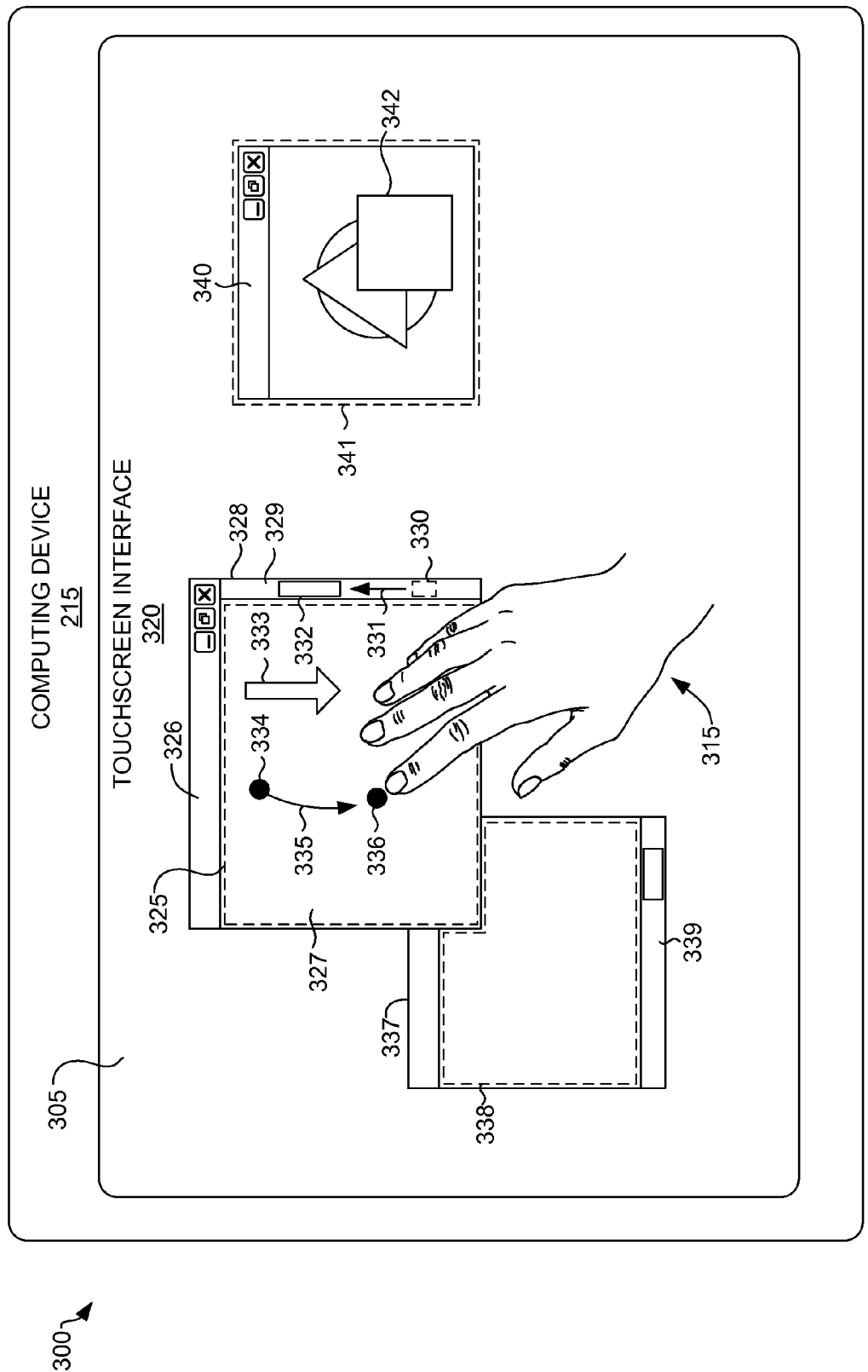
FIG. 3 is a diagrammatic view of a display area on a touchscreen interface illustrating a method for panning content therein, in accordance with an embodiment of the present invention.

Turning now to FIG. 3, a diagrammatic view 300 of a display area 328 on a touchscreen interface 320 that illustrates a method for panning content therein is shown, in accordance with an embodiment of the present invention. Initially, the computing device 215, or another computing device (e.g., computing device 100), is provided with the touchscreen interface 320. The touchscreen interface 320 is configured for surfacing display areas 328, 337, and 341 on a UI display 305. A drag operation 335 is shown being applied by a physical object 315 (e.g., a single-finger gesture) within a content region 325. Typically the drag operation 335 will pan content 327 in the direction 333 that the drag operation 335 is traveling (e.g., translating substantially downward as illustrating). The drag operation includes a point of origination 334, or a location of actuation as described above, and a touch point 336. In addition, the scrollbar tool 329 may provide visual feedback of the panning operation.

In the illustrated example, the drag operation 335 is a gesture moving in a generally downward direction. Accordingly, the content 327 will correspondingly pan in the downward direction 333, thus moving with the physical object 315. The scrollbar tool 329 may provide visual feedback that downward panning is occurring by automatically moving a slider 332 in an upward direction 331 from a previous location 330. In the case that an end of the content 327 occurs during the downward drag operation 335, an over-panning action may be invoked. In one instance, the over-panning action may include translating the display area 328 downward within the UI display 305. Further, in an exemplary embodiment, if the corrective component 225 of FIG. 2 is active, the content 327 may scroll in a substantially vertical direction 333 even when the drag operation 335 includes a slight drift.

Upon providing an input at the display area 328, the underlying application is activated. Because the application underlying the display area 328 is active, while the application underlying display areas 337 and 341 are dormant, the display areas 337 and 341 are unreceptive to inputs during panning in the display area 328. For instance, if the drag operation 335 continued from touch point 336 into a content region 338 of the display area 337, content within the display area 338 would not pan. Instead, panning in the vertical direction 333 may cease as the physical object 315 overruns the lower edge of the content region 325. Or, the entire display area 328 may slide downward across the UI display 305 to indicate the occurrence of an overrun.

The display area 337 includes a horizontal scrollbar tool 339. As such, in contrast to the vertical scrollbar tool 329 of the display area 328, a horizontal drag operation in the content region 338 will cause a panning action, while a vertical drag operation in the content region 338 invokes a secondary action, such as a selection function to highlight text in the content region 338.

The display area 340 does not include a scrollbar. Accordingly, the user is visually notified that the application underlying the display area 340 does not support scrolling functionality. Accordingly, a drag operation within a boundary 341 of the display area 340 will cause the display area 340 to translate across the UI display 305 in connection with a movement of the physical object 315. Alternatively, to initiate a translation of the display area 328, an actuation location of a gesture should occur outside the content region 325, such as within a border/title bar 326 of the display area 328.

Figure 5:
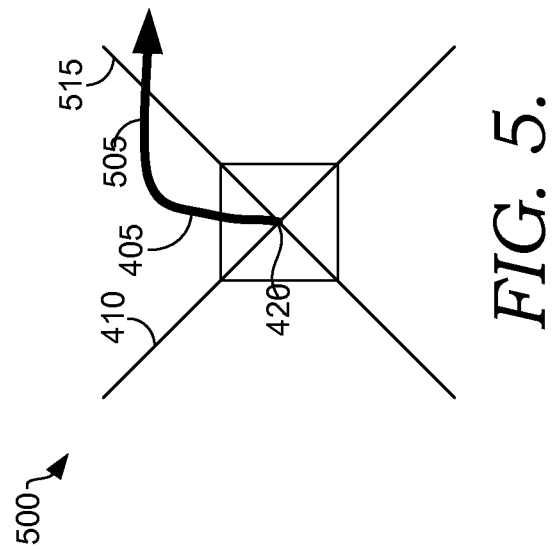
FIGS. 4 and 5 are progressive drag operation depictions illustrating stages of performing the drag operation that switches from panning content to invoking a secondary action, in accordance with embodiments of the present invention.
Figure 4:
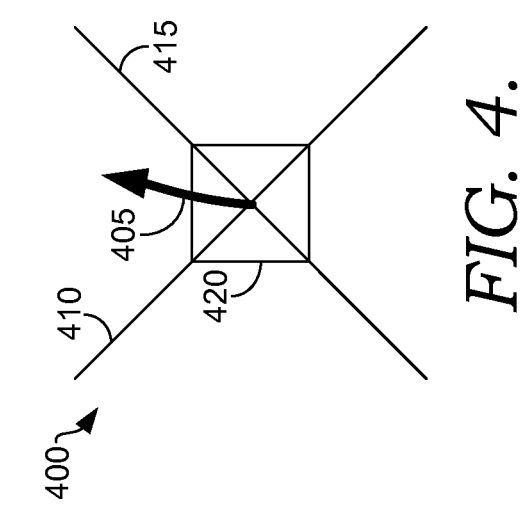

Turning now to FIGS. 4 and 5, progressive drag operation depictions are illustrated that demonstrate stages of performing the drag operation that switches from panning content to invoking a secondary action, in accordance with embodiments of the present invention. Initially, with reference to FIG. 4, a predetermined set of threshold borders 420 are established to disambiguate between a tap-type operation and a drag operation. That is, if the gesture, such as initial drag 405, extends beyond any of the set of threshold borders 420, the gesture is considered a drag operation. In another embodiment, if the gesture is applied and held at the touchscreen interface for longer than a predefined window of time, the gesture is considered a drag operation.

As illustrated in FIG. 4, the initial drag 405 is moving into an upper quadrant; thus the gesture is considered a vertical drag operation in the upward direction. Accordingly, if the application supports scrolling functionality in the vertical direction, the content may move in connection with the initial drag 405. In the case where the correction component 225 of FIG. 2 is active, any drift or wiggle in the initial drag 405 is dampened if it does not cross either of the threshold boundary 410 and 415. Turning, to FIG. 5, a secondary drag 505 crosses the threshold boundary 515. In one embodiment, crossing the threshold boundary 515 pauses the panning functionality. In another embodiment, the secondary drag 505 crossing the threshold boundary 515 may invoke a secondary action, or deactivate the correction component 225 of FIG. 2 such that the dampening functionality is ceased. Accordingly, the content follows the drag operation instead of moving along a direction of the principal axis.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable hardware devices having computer-executable instructions embodied thereon that, when executed, cause the a computing device to perform a panning action or a secondary action upon content of a display area presented on a computing device, the instructions configured to:

detect a user-initiated input applied to the touchscreen interface;

receive actuation information from the touchscreen interface, the touchscreen information including an initial actuation location of the user-initiated input;

ascertain that the initial actuation location occurred within the display area surfaced at the touchscreen interface, the display area being rendered by an application in communication with an operating system of the computing device;

identify that a gesture being performed by the user upon the touchscreen interface includes a first drag operation based on, in part, the touchscreen information;

establish one or more threshold boundaries that intersect the initial actuation location;

initiate the panning action upon identifying the gesture includes the first drag operation;

identify that the gesture being performed by the user upon the touchscreen interface includes a second drag operation based on, in part, the touchscreen information, the second drag operation crossing at least one of the one or more threshold boundaries; and initiate the secondary action upon identifying the gesture includes the second drag operation.

2. The one or more computer-readable hardware devices of claim 1, wherein the instructions are further configured to present an indication of the panning action at the touchscreen interface.

3. The one or more computer-readable hardware devices of claim 1, wherein the first drag operation and the second drag operation represent portions of a single, continuous drag operation, in two or more directions, that comprises the gesture performed by the user.

4. The one or more computer-readable hardware devices of claim 1, wherein, when the panning action is initiated, content within of the display area is panned according to the first drag operation.

5. The one or more computer-readable hardware devices of claim 1, wherein the instructions are further configured to disambiguate the first drag operation from a tap-type operation based on a distance of an uninterrupted drag-movement from the actuation location of the user-initiated input at the touchscreen interface.

6. The one or more computer-readable hardware devices of claim 1, wherein the application represents a touch-naïve application that is unaware it is cooperating with the touchscreen interface.

7. The one or more computer-readable hardware devices of claim 6, wherein the instructions are further configured to identify the touch-naive application supports scrolling functionality.

8. The one or more computer-readable hardware devices of claim 6, wherein when the touch-naïve application is identified as not supporting scrolling functionality, the instructions are further configured to:
fail the initiation of the scrolling action; and
generate mouse messages to be delivered from the operating system to the touch-naïve application.

9. The one or more computer-readable hardware devices of claim 7, wherein the instructions are further configured to determine whether the display area rendered at the touchscreen interface includes a scrollbar control in order to identify the application as supporting scrolling functionality.

10. The one or more computer-readable hardware devices of claim 2, wherein the instructions are further configured to drive a slider of the scroll bar control in a direction based on a direction of the panning at the touchscreen interface in order to present an indication of the panning at the touchscreen interface.

11. The one or more computer-readable hardware devices of claim 3, wherein a distance of the single continuous drag operation is derived by comparing a Cartesianal coordinate representation of the actuation location of the user-initiated input at the touchscreen interface with a Cartesianal coordinate representation of a location of release of the second drag operation.

12. The one or more computer-readable hardware devices of claim 3, wherein the the instructions are further configured to disambiguate the single, continuous drag operation from a tap-type by determining whether a sweep of the touchscreen interface, which comprises the first and second drag operations, overcomes a predefined threshold distance.

13. The one or more computer-readable hardware devices of claim 1, wherein the scrollable direction of the content within the display area is substantially aligned with a direction of the first drag operation.

14. The one or more computer-readable hardware devices of claim 1, wherein the secondary action comprises highlighting text within the content of the display area.

15. A computer system capable of providing additional capabilities to a touch-naive application, the computer system comprising a computer storage medium having a plurality of computer software components embodied thereon, the computer software components comprising:
an input component configured to receive a user-initiated input that includes a location of actuation applied to a touchscreen interface, wherein the user-initiated input includes a location of actuation and a single, continuous gesture comprising a first and second drag operation;
the operating system configured to act as a gesture-interpreting interface between the input component and the touch-naïve application, wherein the operating system is configured to:
detect the first drag operation upon determining that the gesture includes a substantially uninterrupted drag-movement originating from the actuation location that persists for a distance greater than a predefined threshold distance;
initiate a primary action upon detecting the first drag operation within the gesture, wherein the primary action includes a scrolling action;
detect the second drag operation upon determining that the gesture crosses one or more threshold boundaries that are positioned based on, in part, the actuation location; and
initiate a secondary action upon identifying the gesture includes the second drag operation;
the first drag operation and the second drag operation representing portions of a single, continuous drag operation, in two or more directions, that comprises the gesture performed by the user; a distance the single, continuous drag operation being derived by comparing a Cartesianal coordinate representation of the actuation location with a Cartesianal coordinate representation of a location of release of the second drag operation; and
a presentation component configured to reveal an indication of the primary or secondary action to the user.

16. A computerized method for distinguishing between a primary action and a secondary action to be performed at an application upon receiving a gesture at a touchscreen interface, the method comprising:
detecting a single, user-initiated, continuous gesture applied to the touchscreen interface, the gesture including a location of actuation with the touchscreen interface and a first drag operation and a second drag operation associated therewith;
determining whether the first drag operation satisfies a first set of system metrics, the determining satisfaction of the first set of system metrics including identifying whether the first drag operation includes a substantially uninterrupted drag-movement originating from the actuation location that persists for a distance greater than a predefined threshold distance;
when the first drag operation satisfies the first set of system metrics, causing the application to switch from a default mode to a panning mode that supports scrolling functionality of content within the display area;
presenting an indication of the panning mode at the touchscreen interface; the presenting comprising driving a slider of a scroll bar control in a direction based on a direction of panning at the touchscreen interface;
determining whether the second drag operation satisfies a second set of system metrics, the determining satisfaction of the second set of system metrics including identifying whether the second drag operation crosses one or more threshold boundaries that are positioned based on, in part, the actuation location;

when the second drag operation satisfies the second set of system metrics while the application resides in the panning mode, initiating the secondary action; and when the second drag operation fails to satisfy the second set of system metrics while the application resides in the panning mode, initiating the primary action.

17. The computerized method of claim 16, further comprising ascertaining whether the touch location occurred within a display area surfaced at the touchscreen interface, wherein the display area is rendered by the application.

18. The computerized method of claim 16, further comprising, when the first drag operation fails to satisfy the first set of system metrics, retaining the application in the default mode, thereby allowing raw inputs associated with the gesture to flow from the touchscreen interface to the application.

19. The computerized method of claim 16, wherein determining satisfaction of the first set of system metrics further comprises:

identifying a principle axis of the first drag operation based on its average direction on the touchscreen interface;

comparing the principle axis against one or more directions of scrolling enabled by the application; and determining that the principle axis is comparable, within a predefined tolerance, to one or more of the enabled directions of scrolling.

20. The computer system of claim 15, wherein process further comprises disambiguating the single, continuous drag operation from a tap-type by determining whether a sweep of the touchscreen interface, which comprises the first and second drag operations, overcomes a predefined threshold distance.

* * * * *